Jan. 4, 1938. F. M. O'BRIEN, JR 2,104,495
REEL SEAT FOR FISHING RODS
Filed Feb. 9, 1937
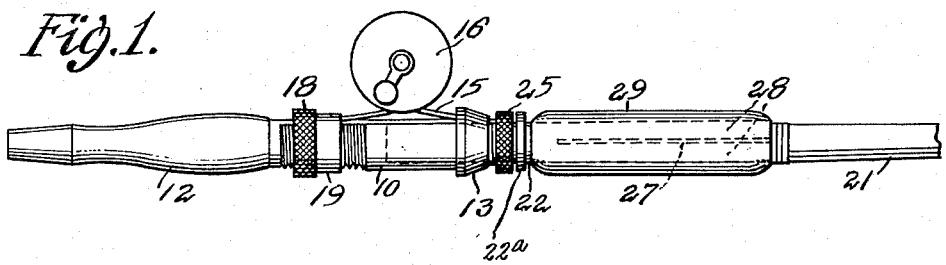
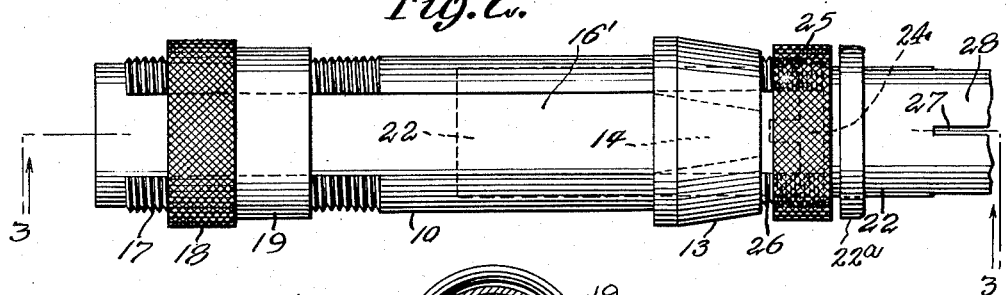
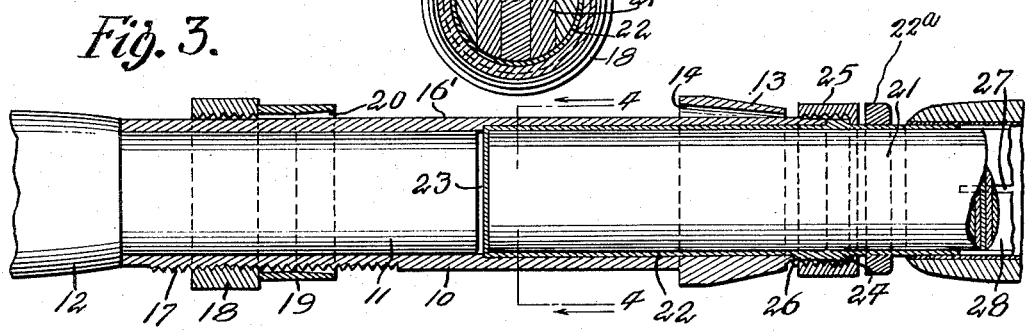
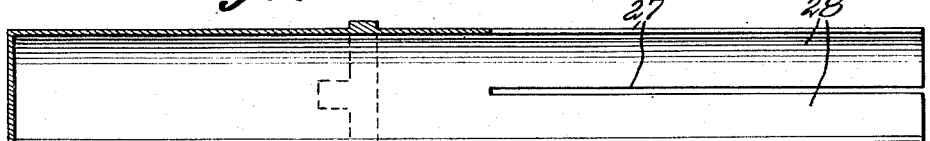
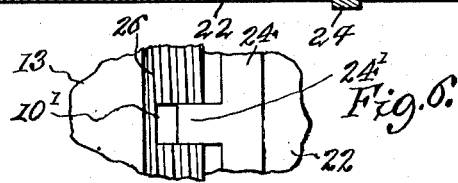
Inventor
F. M. O'Brien, Jr.
By Wilkinson & Mawhinney
Attorneys.

Patented Jan. 4, 1938

2,104,495

UNITED STATES PATENT OFFICE 2,104,495

REEL SEAT FOR FISHING RODS

Francis M. O'Brien, Jr., Miami, Fla.

Application February 9, 1937, Serial No. 124,873

10 Claims. (Cl. 43—22)

The present invention relates to fishing rods, and more particularly to an improved seat for the reel and a novel resilient connection between the reel seat and the pole of the fishing rod.

In prior structures the pole frequently snaps off at its juncture with the reel seat when subjected to quick violent strains such as are encountered in landing large game fish, and also difficulty has been encountered in holding the pole from turning on the reel seat. Various attempts have been made to overcome the turning of the pole by use of keys and the like but they weaken the structure and are not reliable after use to some extent as well as increasing the cost of manufacture and requiring an undue multiplicity of parts.

It is the purpose of this invention to overcome these prior defects and provide a connection between the reel seat and the pole which is resilient and which will ably support the pole and distribute the bending thereof over a considerable length of the pole to prevent an abrupt bending and breaking at any one point.

Another object of the invention is to provide a simple and efficient clamping means which is effective entirely about the pole to hold it to the reel seat and keep the pole from turning therein, and to insure the easy and positive and even unseating or separation of the pole from the reel seat in knocking down the pole, and to insure the proper alining of the reel seat and pole when the parts are assembled.

The invention also embodies certain improvements in the reel seat for wedging and holding the reel plate thereto and maintaining the reel from lateral shifting and otherwise moving when mounted on the reel seat.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a side elevation of the inner end portion of a fishing rod embodying the features of the present invention.

Figure 2 is a fragmentary top plan view, enlarged, of the reel seat and pole coupling.

Figure 3 is a longitudinal section taken through the same on the line 3—3 of Figure 2.

Figure 4 is a transverse section taken through the same on the line 4—4 of Figure 3.

Figure 5 is a detail longitudinal section of the ferrule for the inner end of the pole of the fishing rod before the back-off ring is secured thereon, and Figure 6 is a detail, enlarged fragmentary bottom plan view of the alining lug between the pole and the reel seat.

Referring now to the drawing, the reel seat has a body tube 10 into the inner end of which is fitted the stem 11 of the butt grip 12 of the fishing rod. The tube 10 has, welded or otherwise fixed thereto near its forward end, a holder 13 which may be in the form of a ring, and as shown particularly in Figures 2 and 3, the upper part of the holder 13 is provided with a cavity 14 the upper and lateral walls of which taper outwardly relatively to the tube 10. The cavity 14 is adapted to receive the forward end of the reel plate 15, as shown in Figure 1. The reel plate is adapted to be wedged at opposite sides against lateral shifting and is also wedged downwardly against the upper side of the tube 10 to securely anchor the reel plate in position. The upper side of the tube 10 has a flat surface 16' upon which the reel plate 15 is seated.

The rear end portion of the tube 10 is provided with exterior threads 17 over which is mounted a nut 18 adapted to be advanced over the threads 17 toward the holder 13. A clamping ring 19 is loosely fitted over the threaded portion 17 and is unthreaded, as shown in Figure 3 and is adapted to be advanced by the nut 18 into engagement over the rear end of the reel plate 15. The ring 19 is provided with a flaring inner wall 20 providing a cavity of wedge shape for receiving the rear end of the real plate 15 and is adapted to bind the latter down against the flat surface 16' of the tube 10. The clamping ring 19 also provides a friction lock for the nut 18 after the latter has been turned up into binding position. The reel plate 15 is provided with a reel 16 in the usual manner which extends upwardly from the tube 10 and is firmly held in position by the holder 13 and the clamping ring 19. The forward end of the reel is held from lateral slipping by the lateral walls of the cavity 14 so that the reel is firmly and solidly mounted upon the reel seat.

The reel seat is resiliently connected to the pole 21 of the fishing rod, and to effect this a ferrule 22, of metal of the required thickness and resiliency, is fitted rigidly over the rear end of the pole 21 and is slidably fitted into the forward end of the body tube 10 of the reel seat. The ferrule 22 preferably extends into the tube 10 a distance equal substantially to one-half the length of the tube, or a sufficient distance to obtain the necessary purchase and alinement of the reel seat and pole. The tube 10 may have therein a forwardly facing annular shoulder 23 against which the rear end of the ferrule may seat to further steady the connected parts and to take up longitudinal thrust therebetween.

The ferrule 22 has an annular exterior rib or flange 24 spaced from the rear end of the ferrule a distance equal substantially to the spacing of the internal shoulder 23 from the forward end of the tube 10 so that the rib 24 engages the forward end of the tube 10 simultaneously with the seating of the rear end of the ferrule 22 against the shoulder 23. A flanged coupling nut 25 is carried on the ferrule 22 over the rib 24 thereof and is threaded over the external threaded portion 26 on the forward end of the tube 10 to bind the ferrule 22 on its seat 23 and bind the rib 24 against the tube 10. This double binding action of the nut 25 insures a rigid and non-rotating joint between the tube 10 of the reel seat and the ferrule 22 of the pole.

The forward end of the ferrule 22 comprises a spring support for the pole 21. The forward end of the ferrule is open and has longitudinal slots 27 therein extending from the open end to a point spaced a short distance forwardly of the rib 24 and provides a plurality of spring tongues 28 which extend along the pole a suitable distance to support the same through the zone of flexing adjacent the reel seat. The pole 21 may be of any suitable construction and material, a laminated construction being shown in accordance with my copending application.

The forehandle 29 of the fishing rod is fitted over the resilient section of the ferrule and extends from the rear ends of the tongues 28 forwardly over the same, as shown in Figure 1, and assists in maintaining the tongues in tight fitting engagement about the pole.

To insure the easy separation of the pole from the reel seat without damage to the rod the ferrule 22, on the rod or pole 21, has a fixed flange or back-off ring 22ᵃ in the form of a collar or ring which is silver soldered or brazed on the ferrule 22 shown in Figure 5, and which is spaced outwardly a short distance from the flange 24, as shown in Figure 3, such that the coupling nut 25 engages the flange 22ᵃ before the nut leaves the threads 26 of the tubular body 10, and forcibly and evenly pulls the ferrule 22 away from its seat 23 and loosens the ferrule 22 in the body tube 10 while the nut is being uncoupled from the latter.

To hold the reel seat and rod in non-rotative relation, and to keep the tip of the rod in exact position at all times the flange 24 has at its under side a lug 24' which lies substantially flush with the outer surface of the flange 24 to freely receive the coupling nut 25 thereover, and which extends backwardly to engage in a corresponding recess 10' provided in the forward end of the body 10 of the reel seat. The lug 24' advances into the recess 10' as the ferrule 22 moves toward and against its shoulder 23. The coupling nut 25 thus, also, holds the lug 24' locked to the body tube 10.

It is obvious that various changes and modifications may be made in the details of construction and design of the above specifically described embodiment of this invention without departing from the spirit thereof, such changes and modifications being restricted only by the scope of the following claims.

What is claimed is:
1. In a fishing rod, a reel seat comprising a tubular member having an open end, a ferrule adapted to be fixed upon the inner end of the pole of a fishing rod and removably fitted in said open end of the reel seat, and clamping means between the ferrule and the reel seat for securing the same together against relative rotation and longitudinal movement.

2. In a fishing rod, a reel seat comprising a tubular member having an open end, a pole, and a ferrule fixed on the inner end of the pole and slidably fitted in said end of the reel seat, said ferrule having a split spring tongue portion extending forwardly from the reel seat about the pole to reinforce the same against abrupt bending and breaking in the zone of the forward end of the reel seat.

3. In a fishing rod, a reel seat comprising a tubular member having an open end, a pole, a ferrule fixed upon the inner end of the pole and fitting in said end of the reel seat, and clamping means for securing the ferrule in the reel seat, said ferrule extending forwardly about the pole from the reel seat and having longitudinal slots therein providing spring tongues to yieldably support the pole at its zone of bending adjacent the reel seat.

4. In a fishing rod, a reel seat comprising a tubular member having an open end, a pole, a ferrule fixed upon the inner end of the pole and having an exterior annular rib intermediate its ends and longitudinal slots therein forwardly of the rib to yieldably support the pole under bending pressure, the inner end of said ferrule adapted to fit in the open tubular end of the reel seat with the rib abutting the latter, and a coupling nut engaging over the rib and threaded on the tubular end of the reel seat to clamp the ferrule thereto.

5. In a fishing rod, a reel seat comprising a tubular member having an open tubular part with an intermediate interior shoulder facing forwardly of the reel seat, a pole, a ferrule fixed over the inner end of the pole and adapted for insertion in said tubular part and seating against said shoulder, said ferrule having an exterior annular rib spaced from the end of the ferrule a distance substantially equal to the distance between said shoulder and the forward end of the tubular part, and a coupling nut carried by the ferrule about the rib for threaded engagement over the forward end of the tubular part to clamp the ferrule and pole from turning and from rocking movement in the reel seat, said ferrule having longitudinal slots in its sides in its forward end beyond the rib to provide spring tongues embracing the pole for resiliently supporting the latter against breakage when subjected to bending strains adjacent the reel seat.

6. In a fishing rod, a reel seat comprising a tube open at opposite ends, a butt grip fitted to the rear end of the tube, a polt fitted to the forward end of the tube, a reel plate holder mounted on the upper side of the tube at its forward end and having a cavity with forwardly converging lateral and outer walls for receiving and wedging the forward end of the reel plate, a clamping ring slidable on the rear end of the tube for engagement over the rear end of the reel plate, and a combined advancing and lock nut threaded on the rear end of the tube for engagement against the clamping ring to advance and lock the same on the reel plate.

7. In a fishing rod, a reel seat having a tube externally threaded at opposite ends and having a flat upper surface, a butt grip fitted to the rear end of the tube, a pole ferrule adapted to be fixed over the rear end of the pole of the fishing rod and fitted into the forward end of the tube and having spring tongues embracing the pole to support the same in its zone of bending adjacent the reel seat, securing means between the ferrule and the tube to rigidly interconnect the same, a holder fixed on the forward end of the tube and having a laterally and outwardly tapering cavity for the forward end of a reel plate, and releasable clamping means mounted on the rear threaded end portion of the tube to engage and bind the reel plate upon said flat surface of the tube.

8. In a fishing rod, a reel seat comprising a tubular member having an open end with external threads and a recess in one side opening through said end, a pole, a ferrule on the inner end of the pole removably engaging in said end of the reel seat and having a flange abutting the end of the reel seat to brace the pole and ferrule therein and provided with a lug fitting in said recess to hold the pole from turning on the reel seat, and a coupling nut on the ferrule extending over the flange and engaging the threads on the reel seat to bind the flange thereagainst and hold the pole thereto, said ferrule having a second flange spaced a short distance outwardly from the first flange adapted to receive the coupling nut thereagainst when the latter is turned on the said threads toward uncoupling position to withdraw the ferrule from the reel seat and the lug from said recess.

9. In a fishing rod, a reel seat having a tubular body with an open end and external threads thereat and a recess in one side opening through said end, a pole, a ferrule fitted to the inner end of the pole and removably seated in said open end of the tubular body, said ferrule having a flange thereon abutting the end of the tubular body and having a lug extending from the flange and engaging in said recess to hold the reel seat and pole in fixed alinement, and a coupling nut on the ferrule about the flange thereof and engaging said external threads of the tubular body to bind the flange thereagainst and hold the lug in the recess.

10. In a fishing rod, a reel seat having a tubular body open at one end having threads thereabout, a pole, a ferrule fitted to the inner end of the pole and removably seated in said open end of the tubular body, said ferrule having a pair of closely spaced apart flanges thereon with one flange abutting said end of the tubular body, and a coupling nut on the ferrule about said flange and engaging the threads of the tubular body for binding the flange thereagainst and holding the ferrule therein, said coupling nut adapted to be turned toward uncoupling position and to engage the second flange of the ferrule for drawing the latter out of the tubular body to loosen the ferrule therein during the uncoupling operation.

FRANCIS M. O'BRIEN, Jr.